(12) United States Patent
Corn et al.

(10) Patent No.: US 8,677,591 B2
(45) Date of Patent: Mar. 25, 2014

(54) METHODS AND SYSTEM FOR DISASSEMBLING A MACHINE

(75) Inventors: Randall Stephen Corn, Travelers Rest, SC (US); Douglas Anthony Serieno, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 733 days.

(21) Appl. No.: 12/110,729

(22) Filed: Apr. 28, 2008

(65) Prior Publication Data

US 2009/0265908 A1   Oct. 29, 2009

(51) Int. Cl.
  *G05B 11/32*  (2006.01)
(52) U.S. Cl.
  USPC ............ 29/426.1; 29/426.5; 269/73; 269/900
(58) Field of Classification Search
  USPC ............... 29/426.1, 426.5, 700, 281.1, 283.5; 269/73, 900; 901/36; 294/106
  See application file for complete search history.

(56) References Cited

U.S. PATENT DOCUMENTS

| | | | |
|---|---|---|---|
| 4,096,614 A | 6/1978 | Brungard et al. | |
| 4,998,442 A * | 3/1991 | Brown et al. | 74/89.17 |
| 5,142,211 A * | 8/1992 | Tan | 318/568.1 |
| 5,275,532 A | 1/1994 | Mazeaud et al. | |
| 5,848,859 A * | 12/1998 | Clark et al. | 408/1 R |
| 6,082,966 A | 7/2000 | Hall et al. | |
| 6,507,990 B1 | 1/2003 | Moreno et al. | |
| 7,013,652 B2 | 3/2006 | Gebhardt | |
| 7,195,456 B2 | 3/2007 | Aggarwala et al. | |
| 2007/0235505 A1 | 10/2007 | Meier | |

FOREIGN PATENT DOCUMENTS

| | | |
|---|---|---|
| CN | 1829576 A | 9/2006 |
| CN | 1830616 A | 9/2006 |
| JP | 47018013 A | 9/1972 |
| JP | S5238614 A | 3/1977 |
| JP | H05180194 A | 7/1993 |
| JP | 2003139093 A | 5/2003 |
| JP | 2004197741 A | 7/2004 |

OTHER PUBLICATIONS

Office Action from JP Application No. 2009-099479 dated Jul. 23, 2013, along with unofficial English translation.
Search Report from CN Application No. 200910140543.2 dated Oct. 9, 2012.

* cited by examiner

*Primary Examiner* — David Bryant
*Assistant Examiner* — Christopher Besler
(74) *Attorney, Agent, or Firm* — Armstrong Teasdale LLP (57) ABSTRACT

A system and methods for disassembling a machine is provided. The machine includes a casing including a plurality of arcuate channels defined therein. The system includes a reaction bridge configured to couple to a casing, the reaction bridge including a first leg, a second leg and a support beam extending therebetween, a force device including an actuator and a connecting rod extending therefrom, wherein the force device is coupled to the reaction bridge support beam. The force device is configured to apply a force to an end of a segment positioned in one of the casing channels. The system also includes a clevis assembly coupled to the connecting rod, wherein the clevis assembly is configured to engage the segment to facilitate removal of the segment from the rotary machine.

6 Claims, 14 Drawing Sheets

METHODS AND SYSTEM FOR DISASSEMBLING A MACHINE

BACKGROUND OF THE INVENTION

The field of the invention relates generally to gas turbine engines, and more particularly, to a system and methods for removing stator vane segments from a turbine engine.

At least some known gas turbine engines include, in serial flow arrangement, a high-pressure compressor for compressing air flowing through the engine, a combustor wherein fuel is mixed with the compressed air and ignited to form a high temperature gas stream, and a high pressure turbine. Hot combustion gases are channeled downstream from the combustor towards the turbine, wherein energy is extracted from the combustion gases for use in powering the compressor, as well as producing useful work to propel an aircraft in flight or to power a load, such as in an electrical generator. Some known gas turbine engines may also include a low-pressure compressor, or booster compressor, to supply compressed air to the high pressure compressor.

Known compressors include a compressor casing that may include upper and lower casing sections that are coupled about a rotor assembly. Known compressors include a plurality of alternating rows of circumferentially-spaced stator and rotor blades. Each row of rotor and stator blades includes a series of airfoils that each include a pressure side and a suction side that are coupled together at leading and trailing edges. Each stator blade airfoil extends radially inward from a stator support ring that is inserted into channels that are circumferentially formed in axial succession within a radially-inner side of the combustor casing. Each stator ring is sized and shaped to receive a plurality of stator blade segments that extend circumferentially in a row between a pair of adjacent rows of rotor blade assemblies.

During operation, leading and trailing edges and/or an outer tip of the stator blade may deteriorate or become damaged due to oxidation, thermal fatigue cracking, or erosion caused by abrasives and corrosives in the flowing gas stream. Over time such deterioration may cause some known stator blades to fail, resulting in the airfoil portion becoming detached from a dovetail portion of the blade. In some instances, blade failures have caused catastrophic damage within their engine. To facilitate mitigating such operational effects, blades are periodically inspected for damage, to enable a determination of an amount of damage and/or deterioration to be made. Blades are generally replaced if the damage and/or deterioration meets a certain pre-determined threshold. Alternatively, if the blades have not lost a substantial quantity of material, the blades may be repaired.

For example, at least one known method of replacing stator support ring segments requires the removal of the upper compressor section casing and rotor assemblies. Following rotor assembly removal, each stator blade segment is heated and after reaching a desired temperature, the segment is quenched to facilitate rapid cooling. Each segment is then withdrawn from its respective channel using, for example, a pneumatic peening hammer. A newly fabricated segment is then inserted into the casing channel. Alternatively, after being removed from the rotor assembly, each damaged or deteriorated segment is repaired and refurbished prior to being replaced within the casing channel. However, rotor assembly removal, reinsertion, and compressor reassembly may be a time-consuming and expensive process that may significantly increase repair time and power generator outages.

BRIEF DESCRIPTION OF THE INVENTION

In one aspect, a method for disassembling a machine is provided. The method includes at least partially disassembling a casing of the machine to provide access to at least one arcuate channel defined in the casing, engaging a first end of a segment positioned in the channel using a force device, applying a force to the end of the segment such that the segment is repositioned within a portion of the channel, and removing the segment from the channel.

In another aspect, a system for disassembling a machine is provided. The machine includes a casing including a plurality of arcuate channels defined therein. The system includes a reaction bridge configured to couple to a casing, the reaction bridge including a first leg, a second leg and a support beam extending therebetween, a force device including an actuator and a connecting rod extending therefrom, wherein the force device is coupled to the reaction bridge support beam. The force device is configured to apply a force to an end of a segment positioned in one of the casing channels. The system also includes a clevis assembly coupled to the connecting rod, wherein the clevis assembly is configured to engage the segment to facilitate removal of the segment from the rotary machine.

In yet another aspect, a method for disassembling a machine is provided. The method includes applying an inward force to the end of a segment positioned in an arcuate channel such that a segment is repositioned within a portion of the channel, determining that the segment is mechanically frozen within the channel, and applying an outward force to the end of the segment such that the segment is repositioned within a portion of the channel.

DETAILED DESCRIPTION OF THE INVENTION

Figure 1:
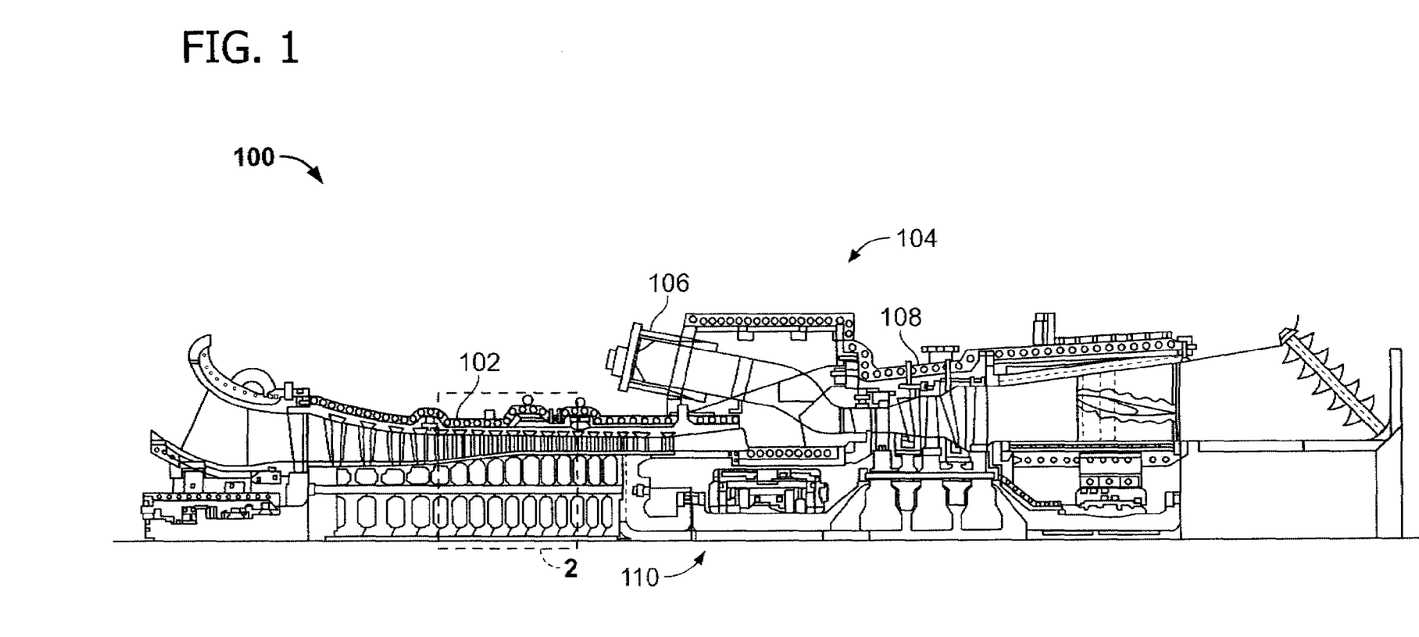
FIG. 1 is a schematic view of an exemplary gas turbine engine.

FIG. 1 is a schematic illustration of an exemplary gas turbine engine 100. Engine 100 includes a compressor 102 and a plurality of combustors 104. Combustor 104 includes a fuel nozzle assembly 106. Engine 100 also includes a turbine 108 and a common compressor/turbine rotor 110 (sometimes referred to as rotor 110).

Figure 2:
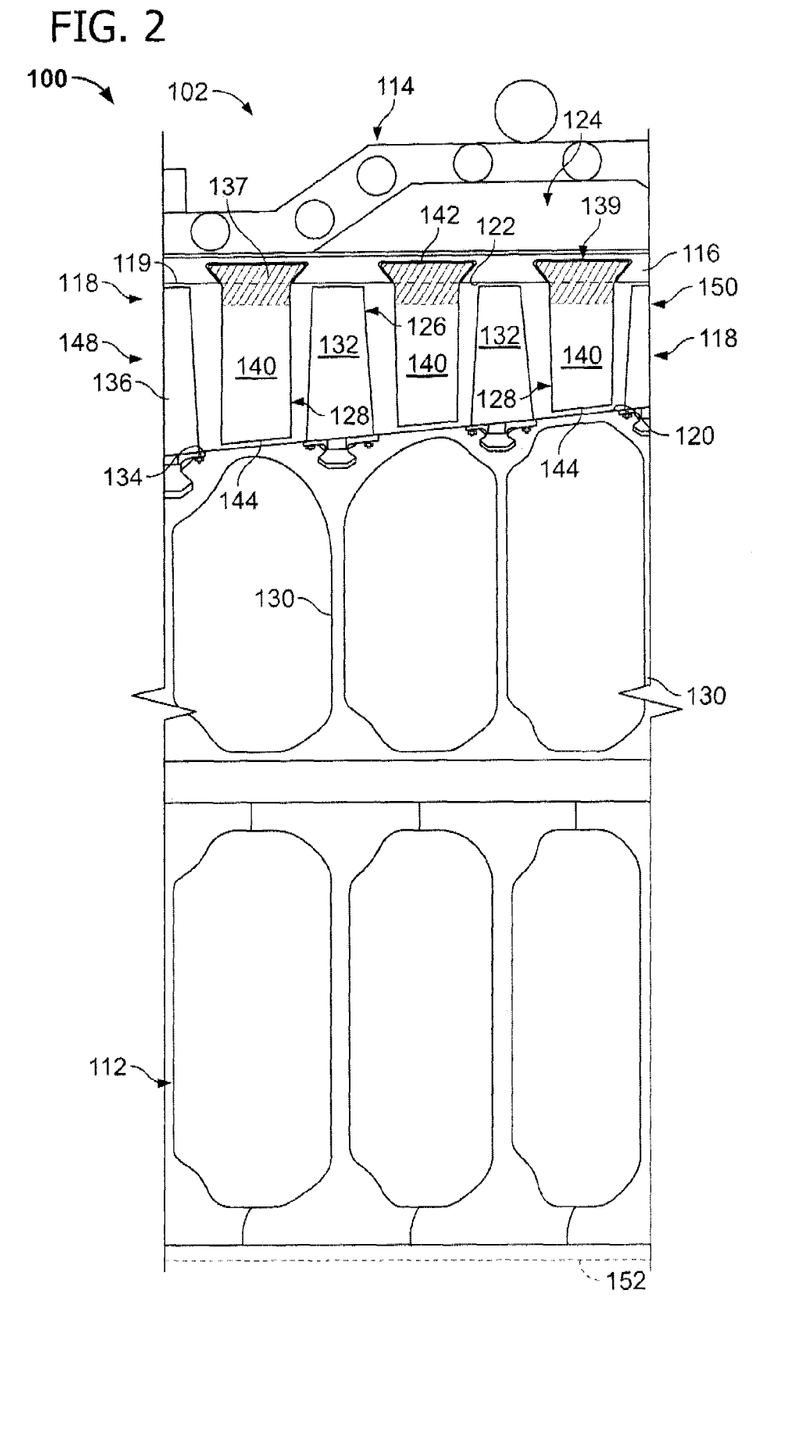
FIG. 2 is an enlarged cross-sectional view of a portion of a compressor that may be used with the gas turbine engine shown in FIG. 1 and taken along area 2.

FIG. 2 is an enlarged cross-sectional view of a portion of compressor 102 taken along area 2 (shown in FIG. 1). Compressor 102 includes a rotor assembly 112 and a stator assembly 114 that are positioned within a easing 116 that at least partially defines a flow path 118 in cooperation with at least a potion of a casing radially inner surface 119. In the exemplary embodiment, rotor assembly 112 forms a portion of rotor 110 and is rotatably coupled to a turbine rotor (not shown). Rotor assembly 112 also partially defines an inner flow path boundary 120 of flow path 118, and stator assembly 114 partially defines an outer flow path boundary 122 of flow path 118, in cooperation with inner surface 119. Alternatively, stator assembly 114 and casing 116 are formed as a unitary and/or integrated component (not shown).

Compressor 102 includes a plurality of stages 124, wherein each stage 124 includes a row of circumferentially-spaced rotor blade assemblies 126 and a row of stator blade assemblies 128, sometimes referred to as stator vanes. Rotor blade assemblies 126 are coupled to a rotor disk 130 such that each blade assembly 126 extends radially outwardly from rotor disk 130. Moreover, each assembly 126 includes a rotor blade airfoil portion 132 that extends radially outward from a blade coupling portion 134 to a rotor blade tip portion 136. Compressor stages 124 cooperate with a motive or working air including, but not limited to, air, such that the motive air is compressed in succeeding stages 124.

Stator assembly 114 includes a plurality of rows of stator rings 137, sometimes referred to as segmented stators, stator-in-rings, stator support rings, and/or stator dovetail rings. Rings 137 are inserted into passages or channels 139 that extend circumferentially, in axial succession, within at least a portion of casing 116. Each channel 139 is defined to be substantially axially adjacent to a portion of casing 116 that is radially outward from and opposite rotor blade tip portions 136. Each stator ring 137 is sized and shaped to receive a plurality of stator blade assemblies 128 such that each row of blade assemblies 128 is positioned between a pair of axially adjacent rows of rotor blade assemblies 126. In the exemplary embodiment, each blade assembly 128 includes an airfoil portion 140 that extends from a stator blade dovetail portion (not shown in FIG. 2) to a stator blade tip portion 144. Compressor 102 includes one row of stator vanes 138 per stage 124, some of which are bleed stages (not shown in FIG. 2). Moreover, in the exemplary embodiment, compressor 102 is substantially symmetric about an axial centerline 152.

In operation, compressor 102 is rotated by turbine 108 via rotor 110. Air collected from a low pressure region 148 via a first stage of compressor 102 is channeled by rotor blade airfoil portions 132 towards airfoil portions 140 of stator blade assemblies 128. The air is at least partially compressed and a pressure of the air is at least partially increased as the air is channeled through flow path 118. More specifically, the air continues to flow through subsequent stages that are substantially similar to the first stage 124 with the exception that flow path 118 narrows with successive stages to facilitate compressing and pressurizing the air as it is channeled through flow path 118. The compressed and pressurized air is subsequently channeled into a high pressure region 150 for use within turbine engine 100.

Figure 3:
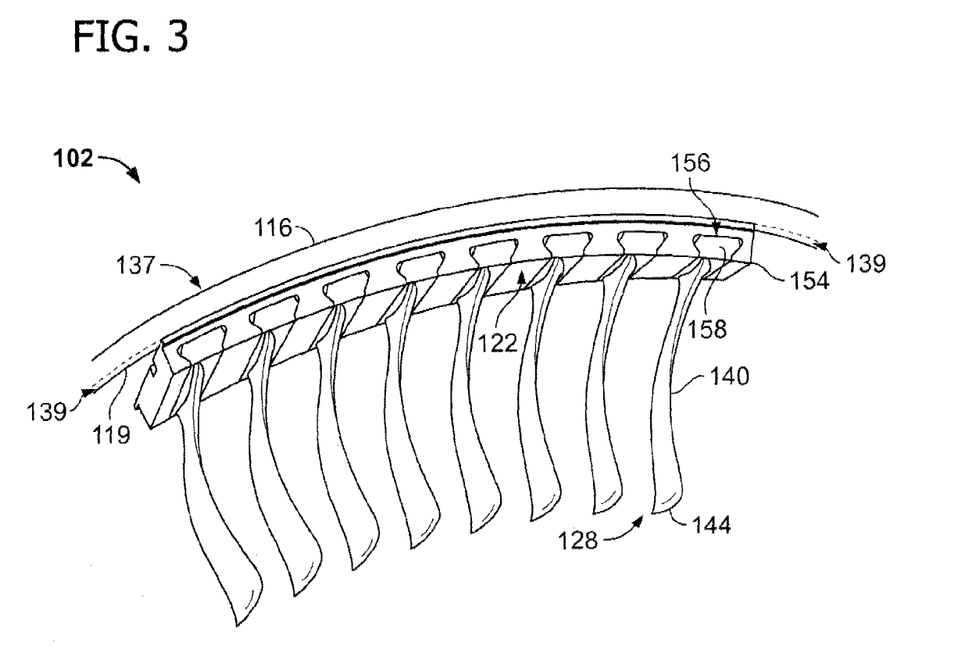
FIG. 3 is a perspective view of an exemplary stator blade ring segment that may be used with the compressor shown in FIG. 2.

FIG. 3 is a perspective view of an exemplary stator blade ring segment 154 that may be used with compressor 102 (shown in FIG. 2). In the exemplary embodiment, segment 154 includes a plurality of stator blade passages 156 that are each defined within segment 154. Moreover, each passage 156 is sized and shaped to receive a stator blade assembly 128 therein. Each assembly 128 includes a stator blade dovetail portion 158 that enables stator blade assemblies 128 to be coupled to casing 116 via stator blade passages 156. In the exemplary embodiment, each stator blade ring segment 154 is coupled to casing 116 via coupling methods that include, but are not limited to, a friction fit, the use of retention hardware (not shown), a welding process, and/or any other mechanical coupling means, and forming segments 154 integrally with casing 116. A plurality of ring segments 154 are inserted into each channel 139 such that segments 154 extend substantially circumferentially within compressor casing 116 and such that circumferentially adjacent segments 154 abut each other. As such, ring segments 154 form at least a portion of outer path flow boundary 122.

Figure 4:
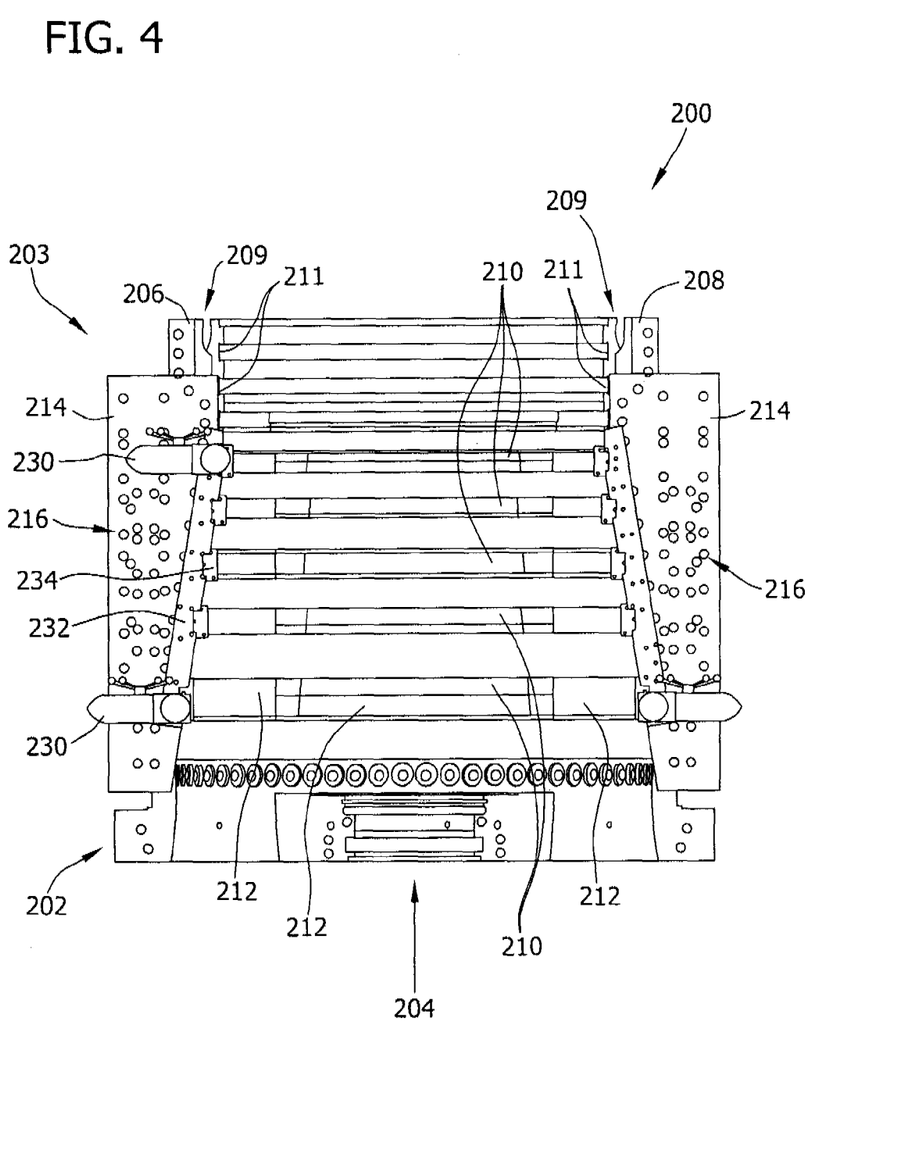
FIG. 4 is a top view of an exemplary drilling system.
Figure 5:
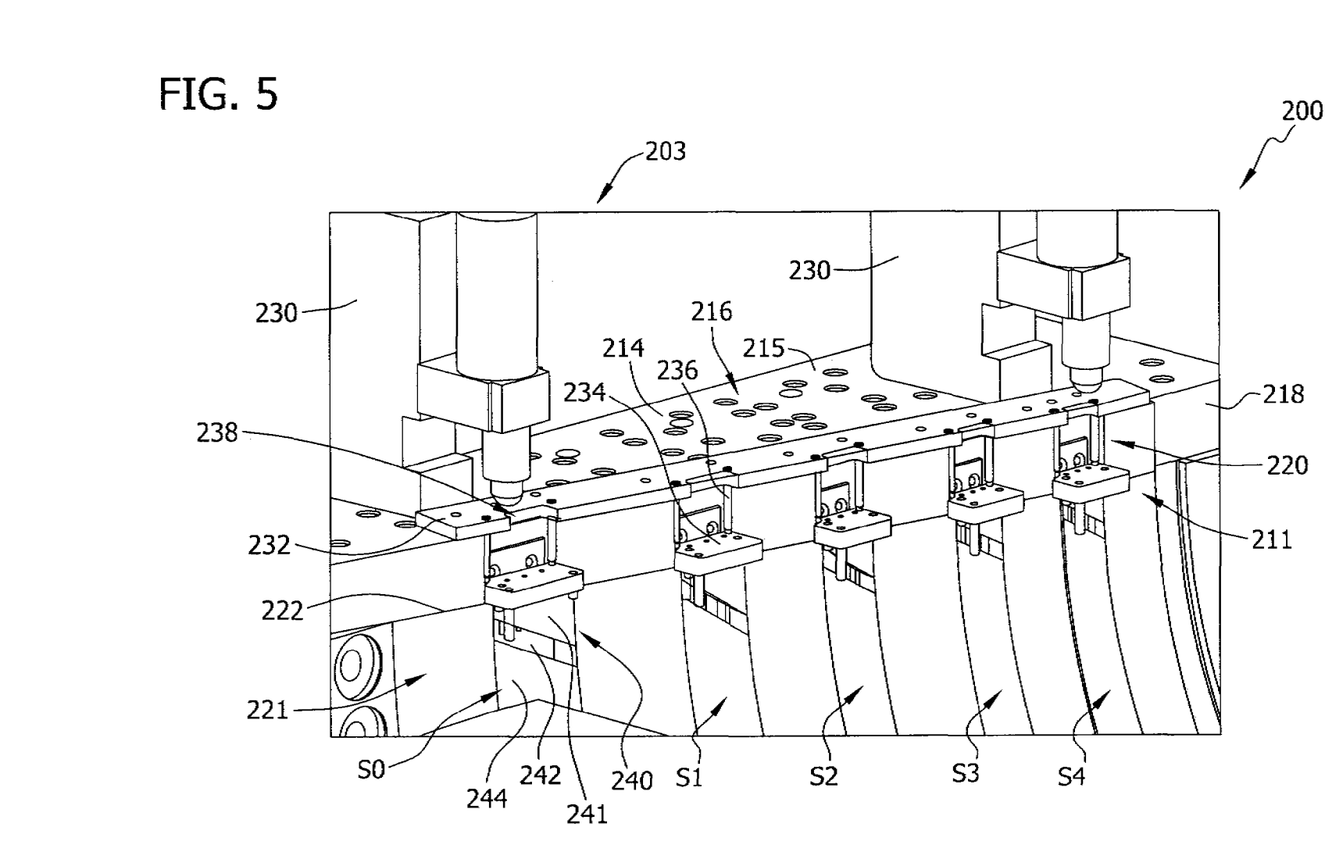
FIG. 5 a fragmentary elevation view of the drilling system shown in FIG. 4.

Referring to FIGS. 4 and 5, FIG. 4 is a top view of an exemplary compressor 200 that includes a casing section 202 and an exemplary drilling system 203. FIG. 5 is a fragmentary elevation view of compressor 200 and drilling system 203, and illustrates five stator blade stages S0, S1, S2, S3 and S4 within casing section 202. Arrow 204 represents an airflow direction through compressor 200. In the exemplary embodiment, casing section 202 includes a first horizontal flange 206 and a second horizontal flange 208 that each extend radially outward from a mid compressor case 209. Casing section 202 includes a plurality of channels 210, including channel ends 211, that are circumferentially defined in axial succession within at least a portion of casing section 202. A plurality of blade segments 212 including stator blades (not shown) are inserted into each channel 210 such that segments 212 extend substantially circumferentially within casing section 202 and such that circumferentially adjacent segments 212 abut each other. In the exemplary embodiment, each channel 210 includes three segments 212. Alternatively, each channel 210 may include any number of segments 212 that enables compressor 200 to function as described herein.

In preparation for removing blade segments 212, at least one mounting plate 214 including a top surface 215, is coupled to either first horizontal flange 206 and/or to second horizontal flange 208. Mounting plate 214 includes a plurality of holes 216 that enable drilling system 203 to be coupled securely thereto, as described in detail below. A mounting plate inner surface 218 includes a series of recessed portions 220 that substantially align with channel ends 211. Mounting plate inner surface 218 is aligned with segment inner surface 221 at a mating surface 222 and is coupled thereto. In the exemplary embodiment, mounting plate 214 is fabricated from steel. Alternatively, mounting plate 214 may be fabricated from any material that enables drilling system 203 to function as described herein.

In the exemplary embodiment, drilling system 203 includes at least one drill 230, a hushing locator plate 232, a plurality of drill guide bushings 234 and a plurality of fasteners 236 extending therebetween. Bushing locator plate 232 is sized to be positioned upon mounting plate top surface 215 such that plate 232 is substantially aligned with mounting plate 214 and such that a plurality of recessed sections 238 defined within plate 232 are aligned with mounting plate recessed portions 220. In the exemplary embodiment, drill 230 is magnetically coupled to mounting plate 214. Alternatively, drill 230 may be coupled to mounting plate 214 using any means that enables drill 230 to function as described herein. In the exemplary embodiment, drill guide bushings 234 are positioned at each channel end 211, and coupled to bushing locator plate 232 via a plurality of fasteners 236.

In operation, drilling system 203 facilitates removal of stator vane segment 212. Specifically, in the exemplary embodiment, drill 230 forms a reference bore (not shown) in segment end 240. Bushing locator plate 232, drill guide bushings 234, and fasteners 236 are then removed and drill 230 forms three holes (shown in FIG. 12) in segment end 240 that each extend from a predetermined depth. More specifically, in the exemplary embodiment, the three holes are bored into segment outer portion 241, through stator blade dovetail portion 242, and partially into an adjacent stator blade segment portion 244.

Figure 6:
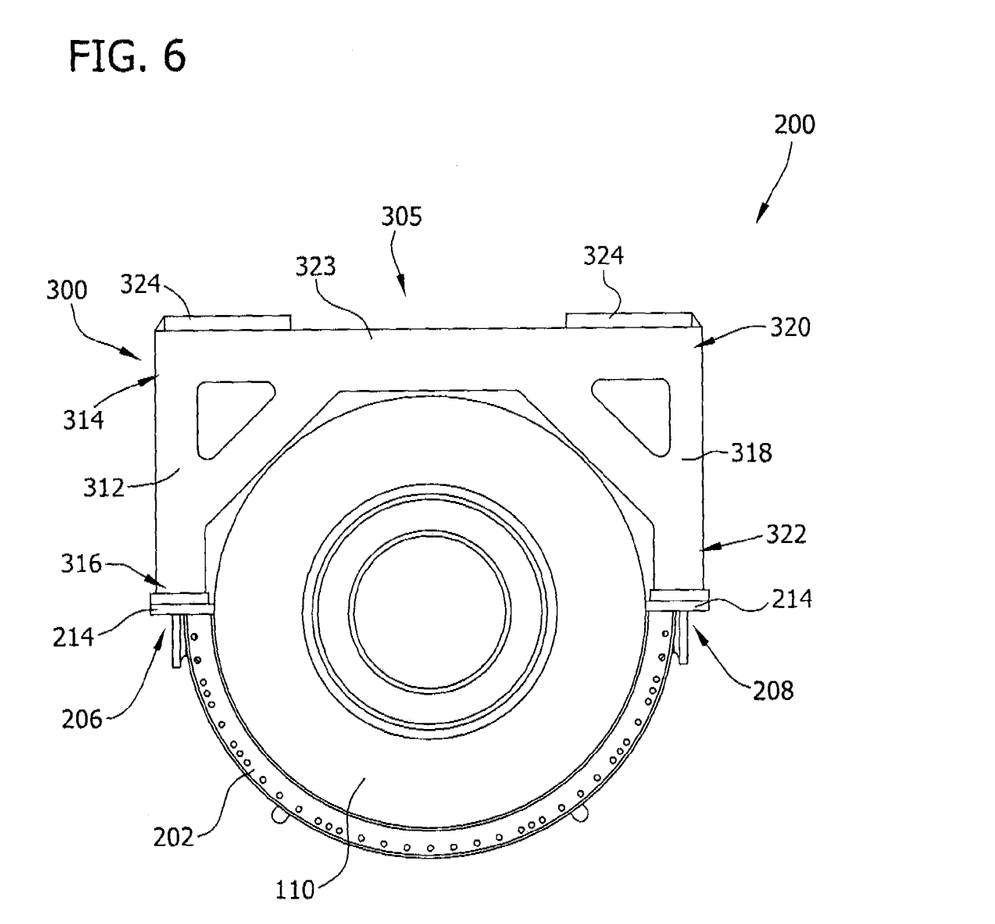
FIG. 6 is an end perspective view of a segment removal system coupled to the compressor shown in FIG. 2.
Figure 7:
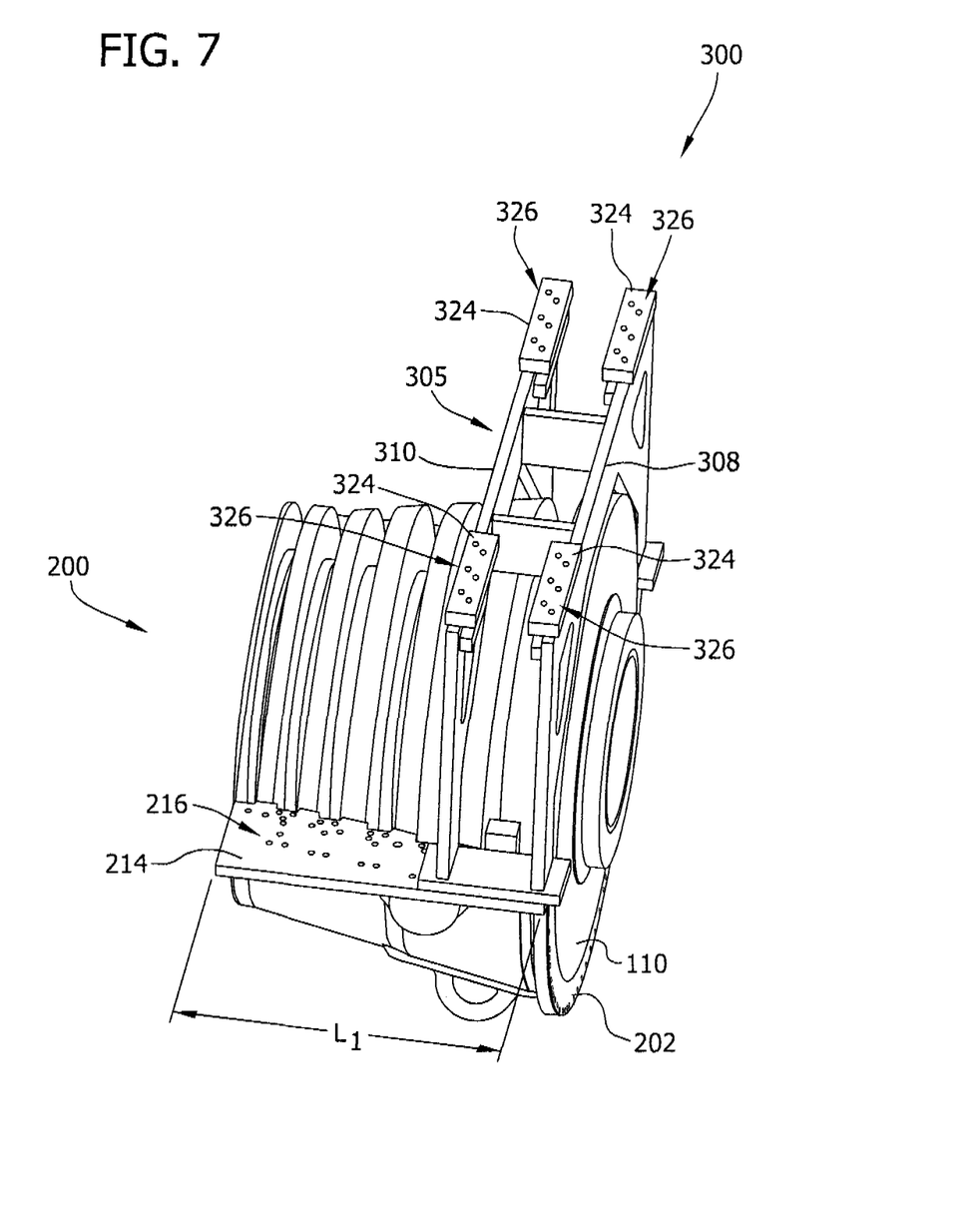
FIG. 7 is a side perspective view of the segment removal system coupled to the compressor shown in FIG. 2.

Referring to FIGS. 6 and 7, FIGS. 6 and 7 are a respective end perspective view and a side perspective view of compressor 200 with an exemplary segment removal system 300 installed. As described herein, compressor 200 includes casing section 202 and rotor 110. In the exemplary embodiment, segment removal system 300 includes a reaction bridge 305 that includes a forward support 308 and rear support 310 that are substantially parallel to each other. Moreover, each support 308, 310 includes a first leg 312 that includes an upper end 314 and a lower end 316, a second leg 318 that includes an upper end 320 and a lower end 322, and a support beam 323 that, in the exemplary embodiment, extends between upper end 314 and upper end 320. In the exemplary embodiment, reaction bridge 305 is coupled to casing section 202 via mounting plate 214. More specifically, and in the exemplary embodiment, lower end 316 is coupled to first horizontal flange 206 via mounting plate 214, and lower end 322 is coupled to second horizontal flange 208 via mounting plate 214, such that reaction bridge 305 extends over casing section 202 and rotor 110. Moreover, in the exemplary embodiment, segment removal system 300 includes a pair of multi-position slides 324 that are each coupled to first leg upper end 314 and a pair of multi-position slides 324 that are coupled to second leg upper end 320. Multi-position slides 324 each include a plurality of placement holes 326, as described in more detail herein. Alternatively, segment removal system 300 may include any number of multi-position slides 324 that enables segment removal system 300 to function as described herein. In operation, reaction bridge 305 is movable along a length $L_1$ of mounting plate 214, and is coupled to mounting plate 214 using holes 216 and at least one fastening mechanism (not shown).

Figure 8:
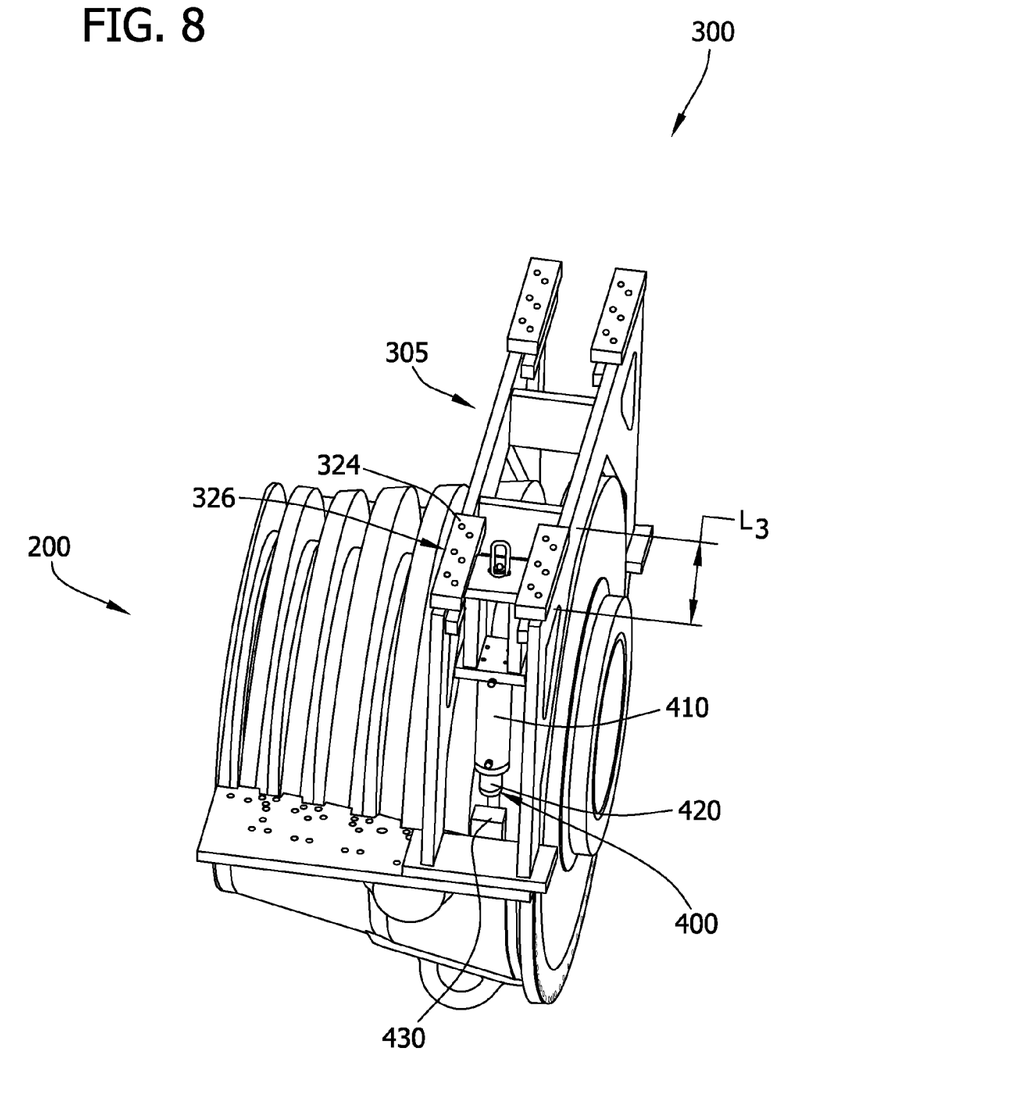
FIG. 8 is an elevation view of an exemplary force device that may be used with the segment removal system shown in FIGS. 6 and 7.
Figure 9:
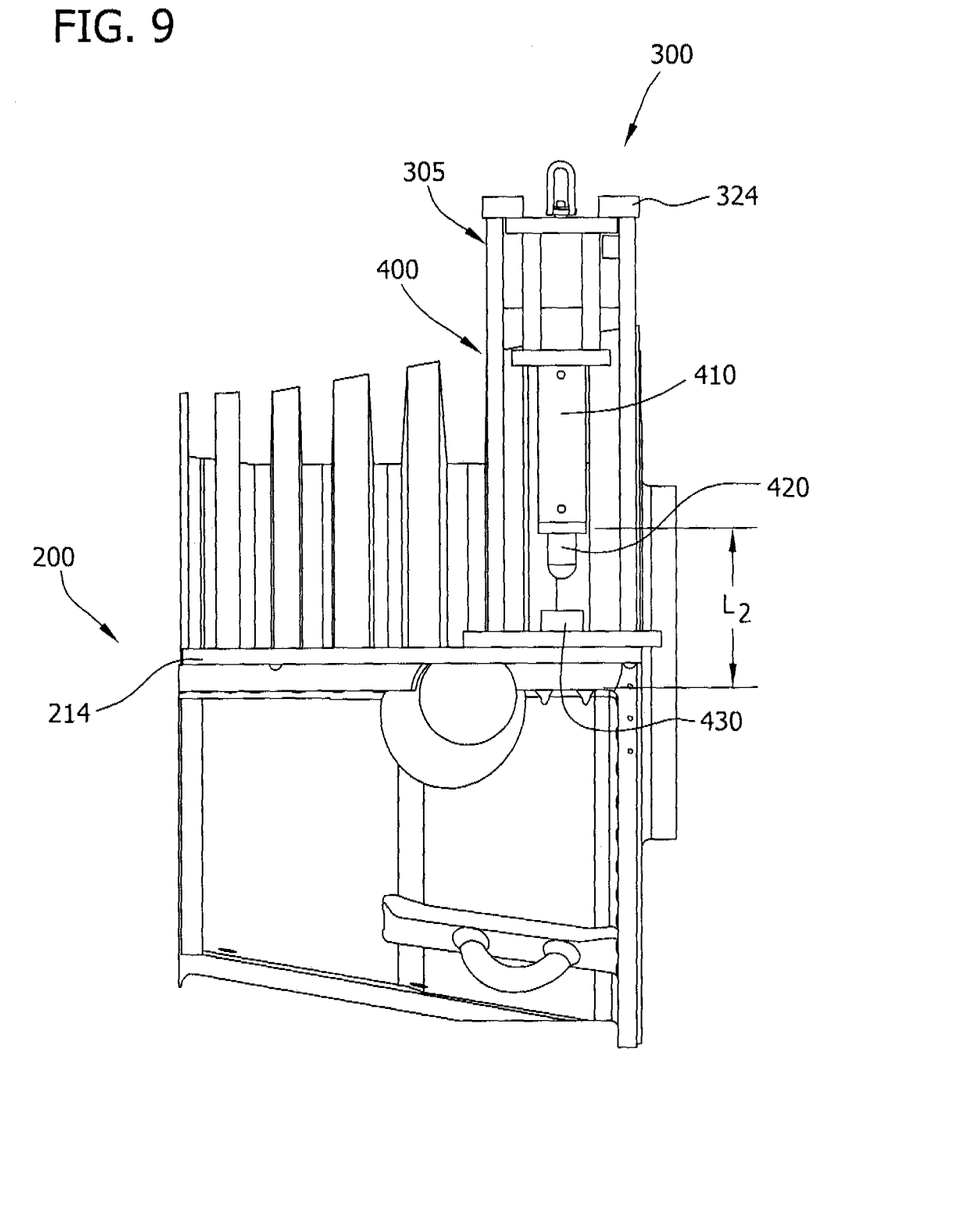
FIG. 9 is a side perspective view of the force device used with the segment removal system shown in FIGS. 6 and 7.

Referring to FIGS. 8 and 9, FIG. 8 is an elevation view of compressor 200 and segment removal system 300, with an exemplary force device 400 installed. FIG. 9 is a side perspective view of compressor 200 and segment removal system 300 with force device 400 installed. In the exemplary embodiment, force device 400 includes an actuator 410 and an engaging rod 420 that extends therefrom. Rod 420 has a defined stoke length $L_2$. In the exemplary embodiment, actuator 410 is a 75-ton hydraulic ram and force device has a 13 inch stroke length. Alternatively, force device 400 maybe any device that enables segment removal system 300 to function as described herein. Force device 400 is coupled to reaction bridge 305 via multi-position slide 324. Specifically, multi-position slide 324 is configured, via placement holes 326, to enable force device 400 to be positioned at a various positions along a length $L_3$ along multi-position slide 324 depending on a location of reaction bridge 305 relative to mounting plate 214.

In operation, and in the exemplary embodiment, actuator 410 forces engaging rod 420 against segment outer end 240 (see FIGS. 4 and 5) to facilitate removing segment 212 from channel 210. More specifically, in the exemplary embodiment, engaging rod 420 induces pressure substantially tangentially against segment end 240 for a stroke length $L_2$.

Upon achieving the maximum stroke length $L_2$, engaging rod 420 is retracted and a mock segment 430 is inserted into segment 212 to enable force device 400 to maintain contact with the segment end 240 beyond the maximum stroke length $L_2$. In the exemplary embodiment, actuator 410 then pushes engaging rod 420 to re-engage segment end 240 via mock segment 430. In the exemplary embodiment, force is applied against segment end 240 until segment 212 is fully removed from channel 210. Alternatively, force is applied to segment end 240 until segment 210 reaches a position where it may be pulled from channel 210, as described herein.

Figure 10:
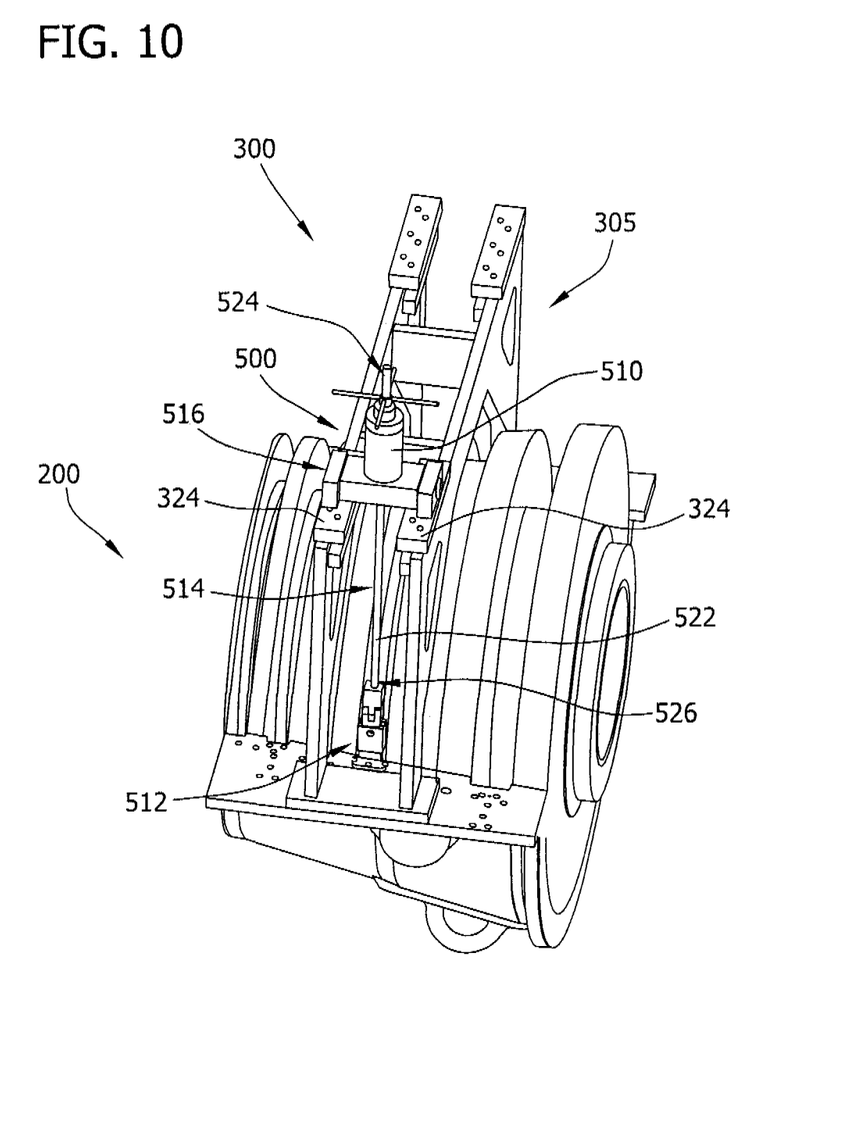
FIG. 10 is an elevation view of a force device used with segment removal system shown in FIGS. 6 and 7.
Figure 11:
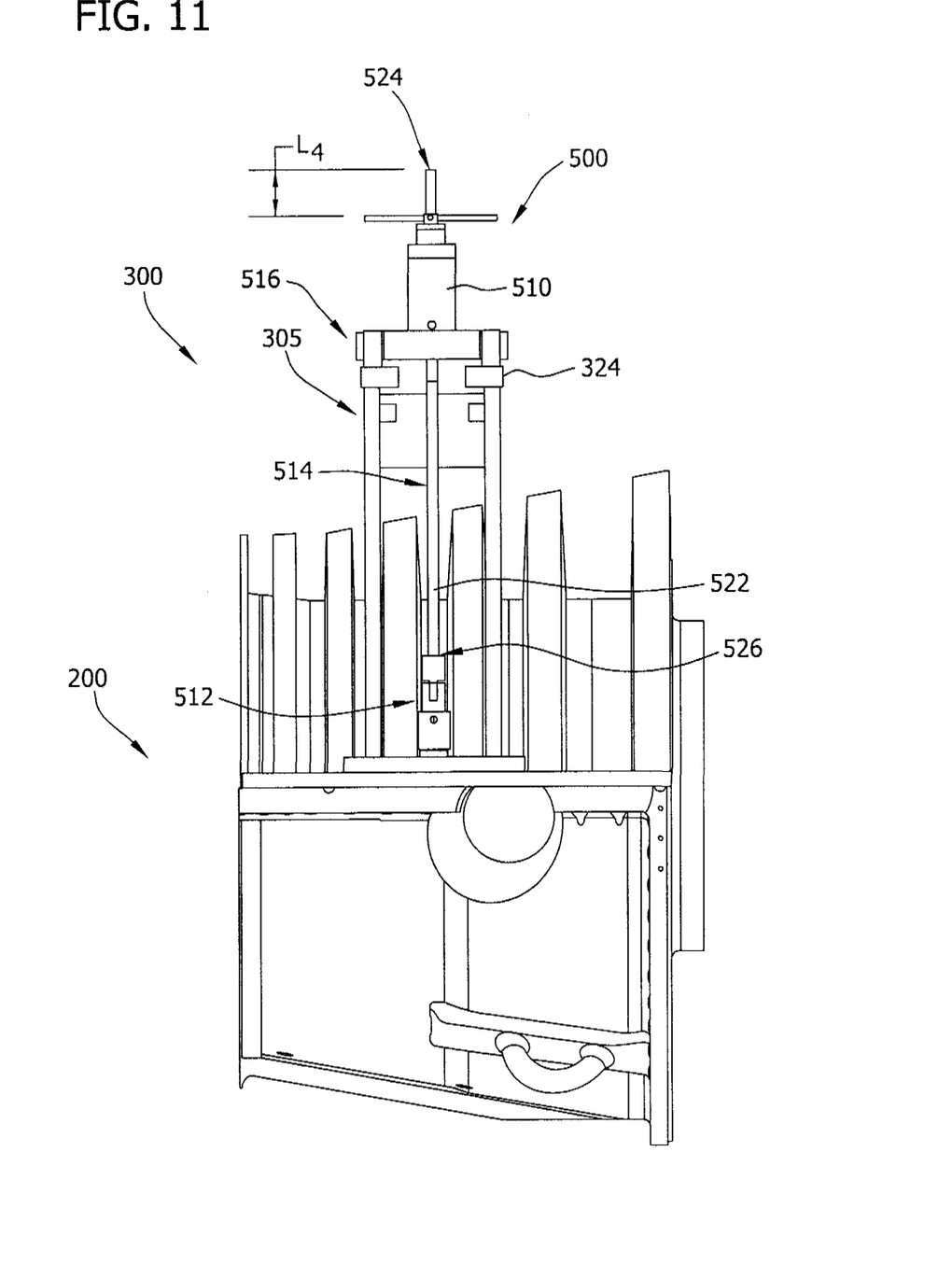
FIG. 11 is a side view of the force device shown in FIG. 10 and used with segment removal system shown in FIGS. 6 and 7.

Referring to FIGS. 10 and 11, FIG. 10 is an elevation view of compressor 200 and segment removal system 300, with an exemplary force device 500 installed. FIG. 11 is a side perspective view of compressor 200 and segment removal system 300 with force device 500 installed. In the exemplary embodiment, force device 500 includes an actuator 510, a clevis assembly 512 and an engaging rod assembly 514 that extends therebetween. In the exemplary embodiment, actuator 510 is coupled to reaction bridge 305 and multi-position slide 324 via a pivot cradle assembly 516. Actuator 510 includes an enclosed axial channel (not shown). In the exemplary embodiment, engaging rod assembly 514 includes a threaded rod 522 that includes a first end 524 and an opposite second end 526 and is coupled to actuator such that first end 524 extends through axial chamber (not shown) of actuator 510 and extends a length $L_4$ outward from actuator 510. In the exemplary embodiment, attachment rod second end 526 is threadedly coupled to clevis assembly 512, as described in detail herein. Moreover, in the exemplary embodiment, actuator 510 is a 30 ton hydraulic actuator. Alternatively, actuator 510 may be any pneumatic, mechanical or electrical actuator that enables segment removal system to function as described herein.

Figure 12:
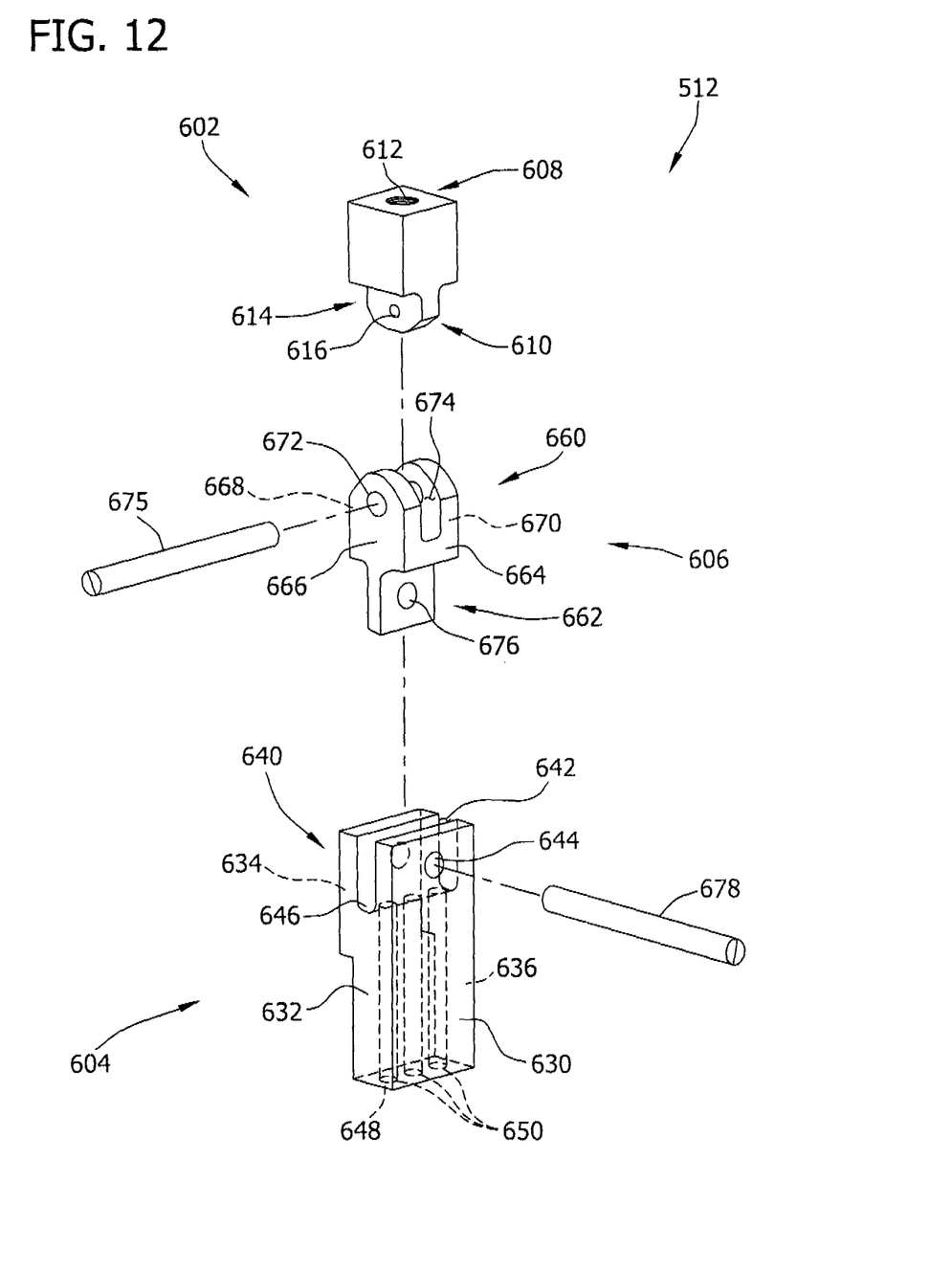
FIG. 12 is an assembly view of an exemplary clevis assembly used with the force device shown in FIGS. 10 and 11.
Figure 13:
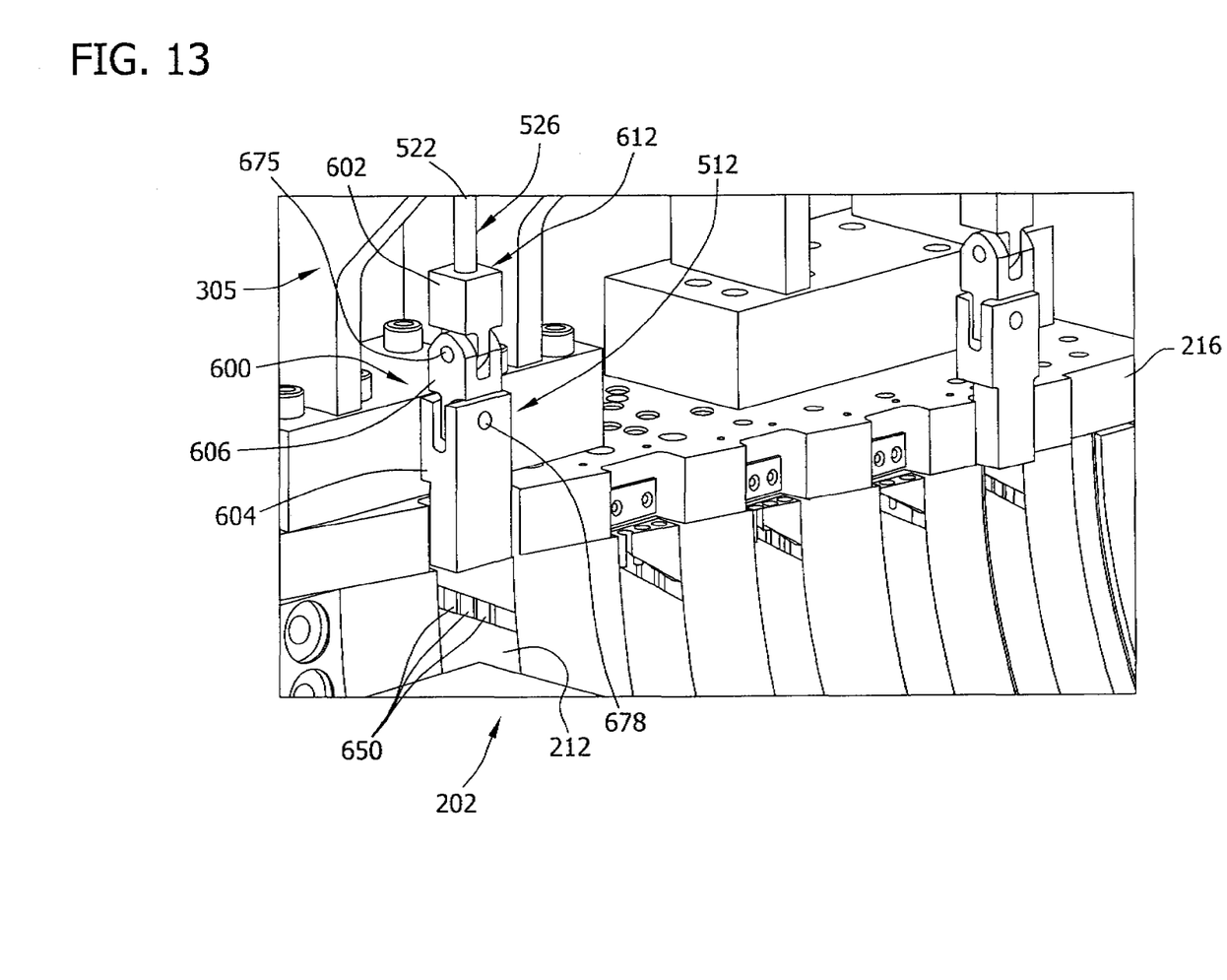
FIG. 13 is a partial elevation view of the exemplary clevis assembly shown in FIG. 12.

Referring to FIGS. 12 and 13, FIG. 12 is an exploded view of an exemplary clevis assembly 512. FIG. 13 is a partial elevation view of exemplary casing section 202 with exemplary clevis assembly 512 coupled to segment outer end 240. In the exemplary embodiment, clevis assembly 512 includes a first component 602, a second component 604 and a joint component 606. First component 602 includes a first end 608 and a second end 610 and is threadedly coupled to attachment rod second end 526 via threaded hole 612. In the exemplary embodiment, first component second end 610 includes a T-shaped extension 614 and mating hole 616 defined therein.

In the exemplary embodiment, second component 604 has a substantially rectangular cross-sectional profile and includes a first side 630, a second side 632, a third side 634 that is opposite first side 630. Moreover, component 604 also includes a forth side 636 that is opposite second side 632, and an upper portion 640 that includes an open channel 642 passing from second side 632 to fourth side 636. Upper portion first side 630 and third side 634 each include a mating hole 644 defined therein that are aligned such that mating hole 644 extends through channel 642. In the exemplary embodiment, channel 642 includes a lower surface 646 and second component 604 includes a bottom surface 648. Three bolt holes 650 extend between channel lower surface 646 and bottom surface 648. Bolt holes 650 enable second component 604 to be coupled to blade segment 212 to facilitate removing segment 212 from stator channels 210.

Joint component 606, in the exemplary embodiment, includes a cubic portion 660 and an extension portion 662. Cubic portion 660 includes a first side 664, a second side 666, a third side 668 that is opposite first side 664, and a fourth side 670 that is opposite second side 666. Portion 660 also includes a mating hole 672 that extends from second side 666 to fourth side 670. Cubic portion 660 includes an open channel 674 that extends from first side 664 to third side 668, and that is sized and oriented to receive first component extension 614 such that first component mating hole 616 and cubic portion mating hole 672 are aligned and receive a first clevis pin 675 when assembled, such that components 602 and 606 are rotatable about pin 675. Extension portion 662 includes a hole 676 defined therein. Second component open channel 642 is sized and oriented to receive joint component extension portion 662 and is oriented such that second component mating hole 644 and extension portion mating hole 676 are aligned to receive a second clevis pin 678 when assembled, such that components 604 and 606 are rotatable about pin 678. In the exemplary embodiment, first clevis pin 675 and second clevis pin 678 are substantially perpendicular to each other.

Figure 14:
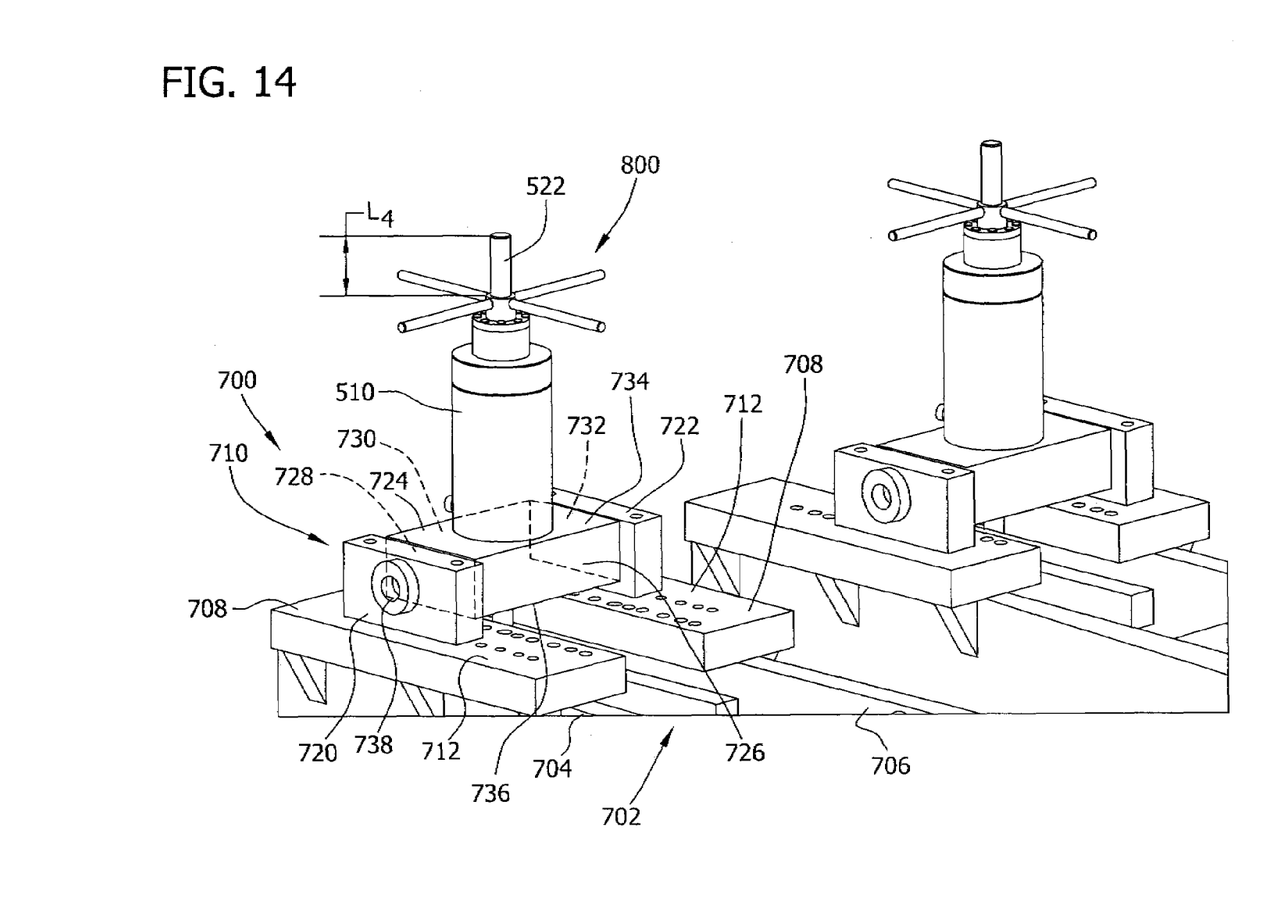
FIG. 14 is an elevation view of a pivot cradle assembly that may be used with the force device shown in FIGS. 10 and 11.

FIG. 14 is an elevation view of actuator 510 with pivot cradle assembly 700. Reaction bridge 702 includes a forward support 704 and rear support 706 that is substantially parallel to support 704. A multi-position slide 708 is coupled to forward support 704 and to rear support 706. A trunnion assembly 710 is coupled to a top surface 712 of each multi-position slide 708. Trunnion assembly 710 includes a first support 720, a second support 722 and a rotatable support 724 coupled therebetween. Rotatable support 724 includes a first side 726, a second side 728, a third side 730 that is opposite first side 726, a fourth side 732 that is opposite second side 728, a top surface 734 and a bottom surface 736. In the exemplary embodiment, a trunnion pin (not shown) extends substantially perpendicularly outward from both second side 728 and fourth side 732. First support 720 has a hole 738 defined therein that is sized to receive a second side trunnion pin (not shown). Similarly, second support 722 has a hole defined therein that is sized to receive fourth side trunnion pin (not shown).

Rotatable support 724 includes a channel (not shown) defined therein that extends from top surface 734 to bottom surface 736 and that is sized and oriented to receive threaded rod 522. Actuator 510 is positioned against rotatable member top surface 734 such that actuator axial channel (not shown) and rotatable support channel (not shown) are substantially aligned. Threaded rod 522 is positioned within the actuator axial channel and the rotatable support channel such that a length extends $L_3$ from actuator 510. An encapsulating bushing assembly 800 is coupled to the length $L_3$ of exposed rod 522.

During operation, actuator 510 exerts a pulling force to threaded rod 522 that, when coupled to segment outer end 240, facilitates the removal of segment 212 from channel 210. Encapsulating bushing assembly 800 is positioned upon the length of exposed threaded rod to facilitate preventing threaded rod 522 from disconnected from the system, should thread rod 522 experience a structural failure during operations. Pivot cradle assembly 700 and trunnion assembly 710 facilitate rotation of actuator 510 during operations.

The above-described methods and system provide a cost-effective and reliable means to facilitate the disassembly of gas turbine engine components. Specifically, stator vane segment removal may be accomplished without removing the rotor assembly from the engine. As such, system outage duration due to repairs may be significantly reduced. Additionally, the segment removal system described herein facilitates reducing segment removal time by enabling a user to quickly change from a segment pushing device to a segment pulling device.

Exemplary embodiments of a process and system for disassembling a machine, particularly removing stator vane sections from a gas turbine engine is described above in detail. The process and system are not limited to the specific embodiments described herein, but rather, steps of the process and components of the system may be utilized independently and separately from other steps and components described herein.

While the invention has been described in terms of various specific embodiments, those skilled in the art will recognize that the invention can be practiced with modification within the spirit and scope of the claims.

What is claimed is:

1. A system for disassembling a rotary machine that includes a casing including a plurality of arcuate channels defined therein, said system comprises:
   a mounting plate configured to couple to a casing of the rotary machine;
   a drilling system removably coupled to said mounting plate;
   a reaction bridge removably coupled to said mounting plate such that said reaction bridge is moveable along a length of said mounting plate, said reaction bridge comprises a forward support and a rear support that is substantially parallel to said forward support, each of said forward and rear supports comprise a first leg, a second leg, and a support beam extending therebetween;
   a force device comprising an actuator and a threaded rod extending therefrom, said force device is rotatably coupled to the reaction bridge support beam, said force device configured to apply a force to an end of a segment positioned in one of a plurality of casing channels; and
   a clevis assembly coupled to said threaded rod, said clevis assembly configured to engage the segment to facilitate removal of the segment from the rotary machine.

2. A system in accordance with claim 1, wherein said reaction bridge further comprises:
   at least one platform slidably coupled to said reaction bridge support beam, said at least one platform supports said force device;
   a trunnion assembly coupled to said at least one slide platform such that said force device is rotatable about an axis.

3. A system in accordance with claim 1, wherein said threaded rod comprises a first end coupled to said actuator and a second end configured to couple to the segment via said clevis assembly.

4. A system in accordance with claim 1, wherein said actuator is a hydraulic actuator.

5. A system in accordance with claim 1, wherein said clevis assembly comprises:
   a first component fixedly coupled to said threaded rod;
   a second component configured to couple to the segment; and
   a joint component coupling said first and second components, said clevis assembly facilitates reducing associated stresses exerted upon said threaded rod.

6. A system in accordance with claim 1, wherein said system further comprises a plurality of guide plates positioned upon said mounting plate to facilitate reducing deterioration of the machine during disassembly.

* * * * *